United States Patent
Singh et al.

(10) Patent No.: US 11,386,897 B2
(45) Date of Patent: Jul. 12, 2022

(54) METHOD AND SYSTEM FOR EXTRACTION OF KEY-TERMS AND SYNONYMS FOR THE KEY-TERMS

(71) Applicant: Tata Consultancy Services Limited, Mumbai (IN)

(72) Inventors: Brajesh Singh, Mumbai (IN); Ritesh Kumar Singh, Mumbai (IN); Prince Kumar Singh, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 118 days.

(21) Appl. No.: 17/037,936

(22) Filed: Sep. 30, 2020

(65) Prior Publication Data

US 2021/0304749 A1    Sep. 30, 2021

(30) Foreign Application Priority Data

Mar. 28, 2020 (IN) .............................. 202021013672

(51) Int. Cl.
  *G06F 40/30* (2020.01)
  *G10L 15/22* (2006.01)
  (Continued)

(52) U.S. Cl.
  CPC .............. *G10L 15/22* (2013.01); *G06F 3/167* (2013.01); *G06F 40/247* (2020.01); *G06F 40/30* (2020.01); *G06F 16/93* (2019.01); *G06F 40/284* (2020.01)

(58) Field of Classification Search
  CPC ................................ G06F 40/284; G06F 16/93
  See application file for complete search history.

(56) References Cited

U.S. PATENT DOCUMENTS

| 2003/0014448 | A1* | 1/2003 | Castellanos | G06F 40/247 715/234 |
| 2008/0033714 | A1* | 2/2008 | Gupta | G06F 40/284 704/9 |
| 2013/0290270 | A1* | 10/2013 | Pareek | G06F 16/93 707/758 |

FOREIGN PATENT DOCUMENTS

| CN | 106066866 A | 11/2016 | |
| CN | 108319583 A | 7/2018 | |
| WO | WO-2008002335 A1 * | 1/2008 | ............. G06Q 30/02 |

OTHER PUBLICATIONS

Author: Pascal Reuss, Rotem Stram,Cedric JuckenackKlaus-Dieter Althoff,Wolfram Henkel,Daniel Fischer,Frieder Henning Title: Feature-TAK—Framework for Extraction, Analysis, and Transformation of Unstructured Textual Aircraft Knowledge Title of the item: Computer Science Date: 2016 Publisher: Semantic Scholar Link: https://www.dfki.de/fileadmin/user_upload/import/8636_ICCBR2016_paper_37_final.pdf.

(Continued)

*Primary Examiner* — Feng-Tzer Tzeng
(74) *Attorney, Agent, or Firm* — Finnegan, Henderson, Farabow, Garrett & Dunner LLP

(57) ABSTRACT

This disclosure relates generally to a method and a system for extraction of key-terms and synonyms for the key-terms. The method discloses to extract the key-terms and further determine a set of relevant synonyms for the extracted key-terms, wherein the key-terms is a collection of small sub-set of words and phrases which are individually meaningful and collectively provide a generic context of a given input text. The method discloses techniques for extraction of key-terms that is independent of any specific supervised training, does not require a huge amount of training data and computationally less intensive. The key-terms are determined in several stages using frequency based techniques (Continued)

based on a relevancy scoring of the key-terms. Further a set of synonyms are determined for the identified key-terms based on a language-based approach or domain specific approach.

14 Claims, 6 Drawing Sheets

(51) Int. Cl.
    *G06F 40/247*     (2020.01)
    *G06F 3/16*     (2006.01)
    *G06F 40/284*     (2020.01)
    *G06F 16/93*     (2019.01)

(56) References Cited

OTHER PUBLICATIONS

Author: Aliaa A.A. Youssif, Atef Z.Ghalwash, Islam A.Amer Title: KPE: An Automatic Keyphrase Extraction Algorithm Title of the item: Computer Science Date: Sep. 2011 vol. 3 Publisher: Research Gate Link: https://www.researchgate.net/publication/319376855_KPE_An_Automatic_Keyphrase_Extraction_Algorithm/link/59e0dc31aca2724cbfd641e4/download.

Author: Claire Brierley, Eric Atwell Title: Exploring imagery in literary corpora with the Natural Language ToolKit Title of the item: Proceedings of CL2009 International Conference on Corpus Linguistics Date: 2009 Publisher: Research Gate Link: https://www.researchgate.net/publication/267625164_Exploring_Imagery_in_Literary_Corpora_with_the_Natural_Language_ToolKit/link/5453e0e80cf2cf51647c263b/download.

Author: Wenbo Wang, Christopher Thomas, Amit Sheth, Victor Chan Title: Pattern-based synonym and antonym extraction Title of the item: Computer Science Date: 2010 Publisher: Research Gate Link: https://www.researchgate.net/publication/220996427_Pattern-based_synonym_and_antonym_extraction/link/0912f513956d03d502000000/download.

\* cited by examiner

METHOD AND SYSTEM FOR EXTRACTION OF KEY-TERMS AND SYNONYMS FOR THE KEY-TERMS

CROSS-REFERENCE TO RELATED APPLICATIONS AND PRIORITY

The present application claims priority from Indian provisional application no. 202021013672, filed on Mar. 28, 2020.

TECHNICAL FIELD

The disclosure herein generally relates to the field of information extraction from documents and, more particularly, to field of extraction of a plurality of key-terms and synonyms for the key-terms, wherein the key-terms include a plurality of key words and a plurality of key-phrases.

BACKGROUND

In the current digital era, exhaustive information is readily available from numerous sources especially in digital/electronic format. With the continuous growth of digital/electronic information, it has been a challenging task to extract relevant information quickly and accurately from the available digital/electronic information. The digital/electronic information typically available as documents is rich with exhaustive information and hence can be tedious for individuals to go through the entire set of documents manually to extract information relevant to them.

Various information retrieval techniques have been used to identify key words in documents to summarize the content of the document and recognize the main topics which are being discussed in the document. Further extracting a collection of small subset of words (key phrases) which are individually meaningful themselves and collectively provide a general sense about the context of the given text has currently gained more popular as it provides a significant performance in terms of relevancy of key terms extracted.

The existing techniques for keyword/key-phrase extraction are mostly supervised or semi-supervised, or unsupervised, each of which has several challenges. The supervised learning methods involving machine learning or deep learning algorithms that would require a huge amount of training data, consumes time and the entire process is very computationally intense while the unsupervised learning methods that work on statistical or linguistic approaches or a combination of both cannot be generalized well on all kinds of dataset. Further challenges in keyword/key-phrase extraction are not restricted to just extracting a relevant keyword/key-phrase in the context of an input text or document, but also extend to finding the right phrases that are similar to the extracted keyword/key-phrase in the context of an input text or document.

SUMMARY

Embodiments of the present disclosure present technological improvements as solutions to one or more of the above-mentioned technical problems recognized by the inventors in conventional systems. For example, in one embodiment, a method and a system for extraction of key-terms and synonyms for the key-terms is provided. The method discloses to extract key-terms and further determine a set of relevant synonyms for the extracted key-terms, wherein the key-terms is a collection of small sub-set of words and phrases which are individually meaningful and collectively provide a generic context of the given input text. The method discloses techniques for extraction of key-terms that is independent of any specific supervised training and does not require a huge amount of training data. The key-terms are determined in several stages using frequency based techniques based on a relevancy scoring of the key-terms. Further a set of synonyms are determined for the identified key-terms based on a language-based approach or domain specific approach.

In another aspect, a method for extraction of key-terms and synonyms for the key-terms is provided. The method includes extracting, by one or more hardware processors, a plurality of raw text from a plurality of text documents using a plurality of parsing techniques, wherein the plurality of text documents is obtained from a plurality of sources. The method further includes resolving contractions, wherein contraction are identified and replaced in the raw text, wherein any word or any phrase in the raw text that has been shortened by dropping one or more letters is replaced with its full form using a contraction resolution tool. The method further includes resolving acronyms in the raw text to generate resolved raw terms by identifying at least one acronym by creating a context window and replacing the identified at least one acronym with corresponding long forms based on regular expression (regex) techniques. The method further includes pre-processing the plurality of resolved raw text, wherein the pre-processing comprises at least one of tokenizing, part of speech (POS) tagging, filtering punctuations, filtering stop-words, filtering any excluded POS tags, lemmatizing, filtering domain specific words. The method further includes extracting a basic set of key-terms and a frequency score corresponding to each of the basic set of key-terms from the pre-processed text based on a key-term extraction technique, wherein the extracted basic set of key-terms includes a plurality of keywords and a plurality of key-phrases comprising of a plurality of an n-gram terms. The method further includes determining a revised set of key-terms from the basic set of key-terms and a relevancy score from the frequency score corresponding to each of the revised set of key-terms using a reconciliation technique based on a domain language model. The method further includes identifying a final set of key-terms from the revised set of key-terms based on the relevancy score, wherein the revised set of key-terms are sorted based on the relevancy score to generate the final set of key-terms. The method further includes determining a set of synonyms for the identified final set of key-terms based on a domain language model or a language model corresponding to the identified final set of key-terms. The method further includes displaying the final set of key-terms and the set of synonyms for the identified final set of key-terms.

In another aspect, a system for extraction of key-terms and synonyms for the key-terms is provided. The system comprises a memory for storing instructions and is connected to one or more Input/Output (I/O) interfaces. The system further comprises one or more hardware processors coupled to the memory via the one or more I/O interface, wherein the one or more hardware processors are configured by the instructions to implement extraction of key-terms and synonyms for the key-terms using a raw text extractor for extracting, by one or more hardware processors, a plurality of raw text from a plurality of text documents using a plurality of parsing techniques, wherein the plurality of text documents is obtained from a plurality of sources. The system further comprises a contraction resolver configured for resolving contractions, wherein contractions are identified and replaced in the raw text, wherein any word or any phrase in the raw text that has been shortened by dropping one or more letters is replaced with its full form using a contraction resolution tool. The system further comprises an acronym resolver configured for resolving acronyms in the raw text to generate resolved raw terms by identifying at least one acronym by creating a context window and replacing the identified atleast one acronym with corresponding long forms based on regular expression (regex) techniques. The system further comprises a pre-processor configured for pre-processing the plurality of resolved raw text, wherein the pre-processing comprises atleast one of tokenizing, part of speech (POS) tagging, filtering punctuations, filtering stop-words, filtering any excluded POS tags, lemmatizing, filtering domain specific words. The system further comprises a domain language model that comprises exhaustive vocabulary data to be used during key-term extraction and synonym extraction, wherein the exhaustive vocabulary data is a vector representation of semantic meaning of a term or a word. The system further comprises a key-term extractor that further includes a basic key-term module configured for extracting a basic set of key-terms and a frequency score corresponding to each of the basic set of key-terms from the pre-processed text based on a key-term extraction technique. The system further comprises a revised key-term module configured for determining a revised set of key-terms from the basic set of key-terms and a relevancy score from the frequency score corresponding to each of the revised set of key-terms using a reconciliation techniques based on the domain language model and a final key-term module configured for identifying a final set of key-terms from the revised set of key-terms based on the relevancy score, wherein the revised set of key-terms are sorted based on the relevancy score to generate the final set of key-terms. The system further comprises a synonym module for configured determining a set of synonyms for the identified final set of key-terms based on the domain language model or a language model. The system further comprises a display module for configured displaying the final set of key-terms and the set of synonyms for the identified final set of key-terms.

Another embodiment provides a non-transitory computer-readable medium having embodied thereon a computer program for a computer readable program, wherein the computer readable program, when executed by one or more hardware processors, causes extraction of key-terms and synonyms for the key-terms. The program includes extracting, by one or more hardware processors, a plurality of raw text from a plurality of text documents using a plurality of parsing techniques, wherein the plurality of text documents is obtained from a plurality of sources. The program further includes resolving contractions, wherein contraction are identified and replaced in the raw text, wherein any word or any phrase in the raw text that has been shortened by dropping one or more letters is replaced with its full form using a contraction resolution tool. The program further includes resolving acronyms in the raw text to generate resolved raw terms by identifying at least one acronym by creating a context window and replacing the identified at least one acronym with corresponding long forms based on regular expression (regex) techniques. The program further includes pre-processing the plurality of resolved raw text, wherein the pre-processing comprises at least one of tokenizing, part of speech (POS) tagging, filtering punctuations, filtering stop-words, filtering any excluded POS tags, lemmatizing, filtering domain specific words. The program further includes extracting a basic set of key-terms and a frequency score corresponding to each of the basic set of key-terms from the pre-processed text based on a key-term extraction technique, wherein the extracted basic set of key-terms includes a plurality of keywords and a plurality of key-phrases comprising of a plurality of an n-gram terms. The program further includes determining a revised set of key-terms from the basic set of key-terms and a relevancy score from the frequency score corresponding to each of the revised set of key-terms using a reconciliation technique based on a domain language model. The program further includes identifying a final set of key-terms from the revised set of key-terms based on the relevancy score, wherein the revised set of key-terms are sorted based on the relevancy score to generate the final set of key-terms. The program further includes determining a set of synonyms for the identified final set of key-terms based on a domain language model or a language model corresponding to the identified final set of key-terms. The program further includes displaying the final set of key-terms and the set of synonyms for the identified final set of key-terms It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
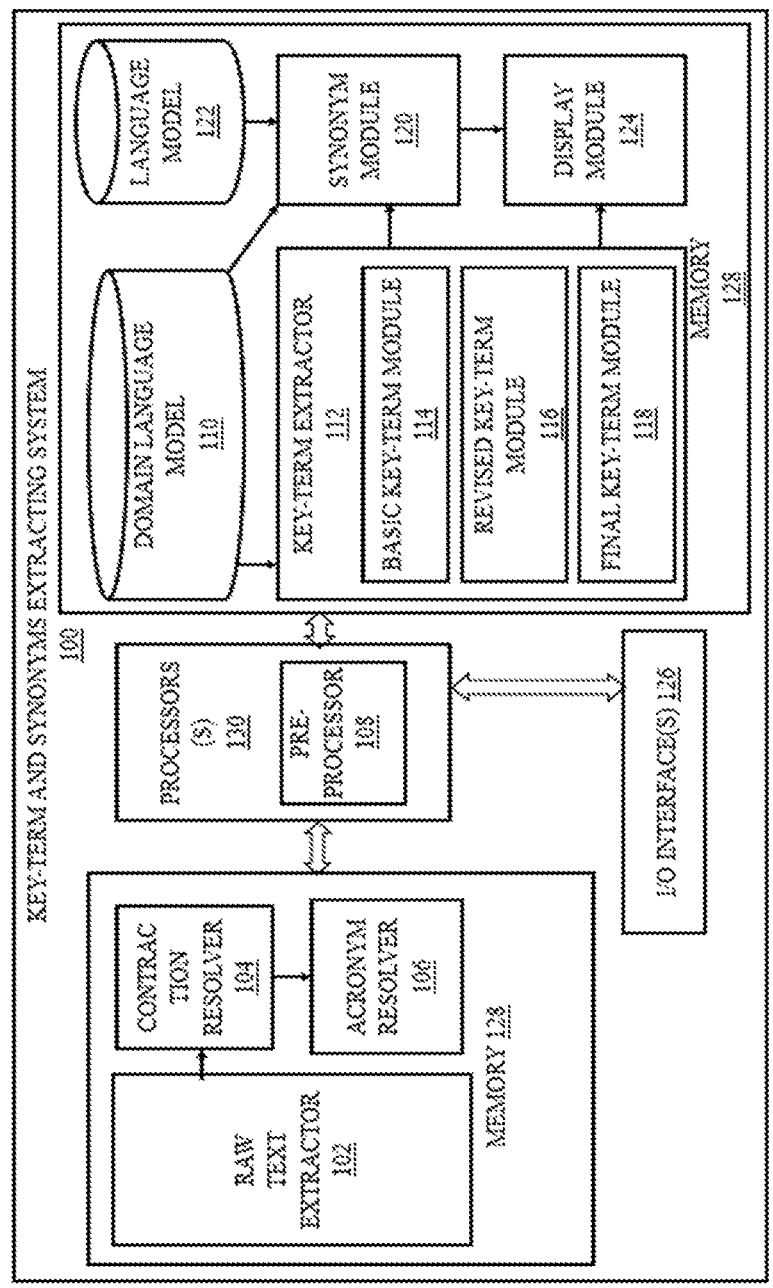
FIG. 1 is a functional block diagram of a key-term and synonyms extracting system for extraction of key-terms and synonyms for the key-terms, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

A method and a system for extraction of key-terms and synonyms for the key-terms is provided. The method disclosed herein extracts key-terms and further determines a set of relevant synonyms for the extracted key-terms, wherein the key-terms is a collection of small sub-set of words and phrases which are individually meaningful and collectively provide a generic context of the given input text. The disclosed techniques for extraction of key-terms is independent of any specific supervised training, does not require a huge amount of training data and computationally less intensive. The key-terms are determined in several stages using frequency based techniques based on a relevancy scoring of the key-terms. Further a set of synonyms are determined for the identified key-terms based on a language-based approach or domain language specific approach.

Referring now to the drawings, and more particularly to FIG. 1 through FIG. 5B, where similar reference characters denote corresponding features consistently throughout the figures, there are shown preferred embodiments and these embodiments are described in the context of the following exemplary system and/or method.

FIG. 1 is a block diagram of a key-term and synonyms extracting system (100) for extraction of key-terms and synonyms for the key-terms, in accordance with an example embodiment.

In an embodiment, the key-term and synonyms extracting system (100), interchangeably referred herein as system 100, includes processor(s), alternatively referred as one or more hardware processors 130, communication interface device(s), alternatively referred as input/output (I/O) interface(s) (126), and one or more data storage devices or a memory (128) operatively coupled to the processor(s) (130). The system 100, may be alternatively referred herein as system 100 or device 100. The system 100 with one or more hardware processors is configured to execute functions of one or more functional blocks of the system 100.

Referring to the components of system 100, in an embodiment, the processor(s) (104), can be one or more hardware processors (104). In an embodiment, the one or more hardware processors (104) can be implemented as one or more microprocessors, microcomputers, microcontrollers, digital signal processors, central processing units, state machines, logic circuitries, and/or any devices that manipulate signals based on operational instructions. The one or more hardware processors 130 includes a pre-processor (108). Among other capabilities, the one or more hardware processors (104) are configured to fetch and execute computer-readable instructions stored in the memory (128). In an embodiment, the system (100) can be implemented in a variety of computing systems including laptop computers, notebooks, hand-held devices such as mobile phones, tablets, personal digital Assistants (PDAs), servers, cloud system and the like.

The I/O interface(s) (126) can include a variety of software and hardware interfaces, for example, a web interface, a graphical user interface for various viewing of messages displayed in the viewports, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) (106) can include one or more ports for connecting a number of devices (nodes) of the system 100 to one another or to another server. The I/O interface (106) can receive a plurality of text documents from the connected number of devices and/or servers or any other external sources. In an embodiment, the text documents may be stored in a repository (not shown) in the memory (128).

The memory (128) may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Thus, the memory (128) may comprise information pertaining to input(s)/output(s) of each step performed by the processor(s) (130) of the system 100 and methods of the present disclosure including receiving original messages and final processed messages to be displayed in the viewport.

Figure 5A:
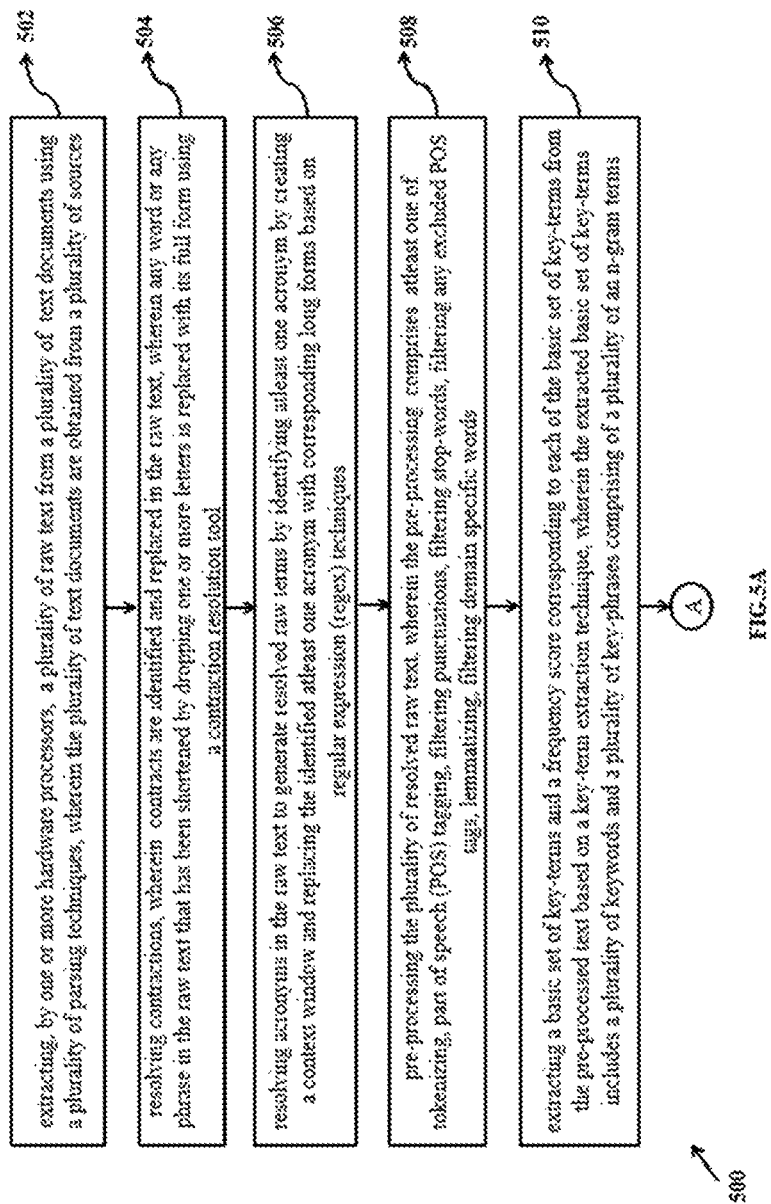
FIG. 5A and FIG. 5B is an exemplary flow diagram for extraction of key-terms and synonyms for the key-terms, according to some embodiments of the present disclosure.
Figure 5B:
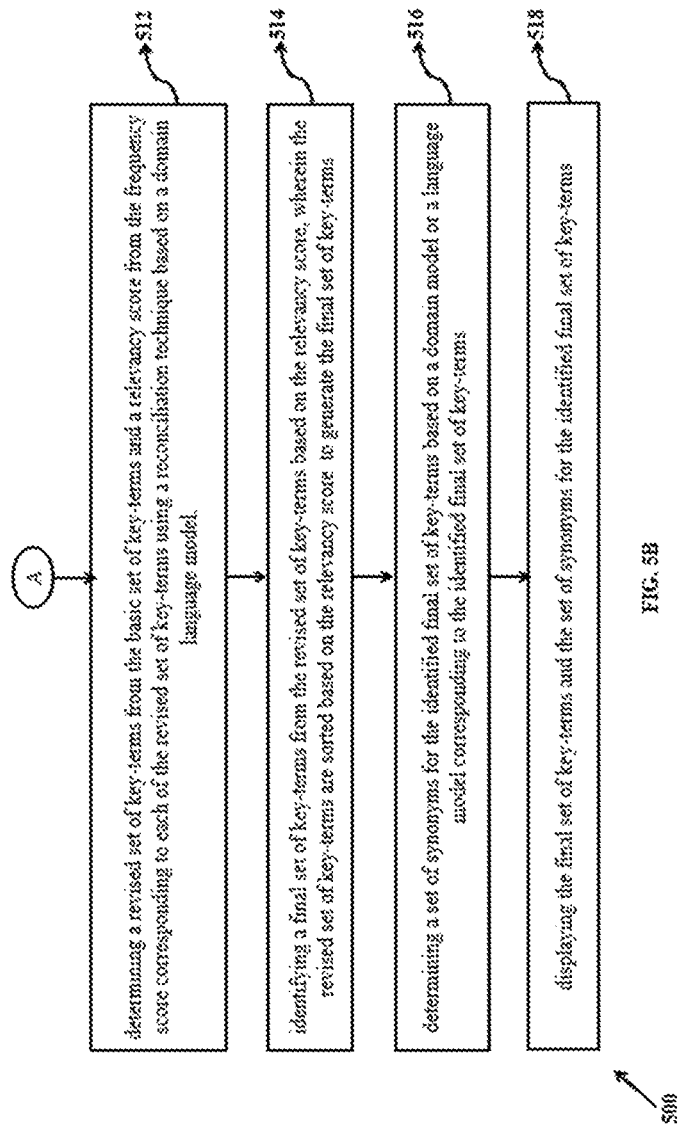

Functions of the components of the system (100) are explained in conjunction with functional modules of the system (100) stored in the memory (128) and further explained in conjunction with flow diagram of FIG. 5A and FIG. 5B.

In an embodiment of the present disclosure, the FIG. 1 illustrates a key-term and synonyms extracting system (100), wherein the memory (128) comprises a raw text extractor (102) configured for extracting a plurality of raw text from a plurality of text documents using a plurality of parsing techniques. The memory (128) further comprises a contraction resolver (104) for resolving contractions, wherein contractions are identified and replaced in the raw text, wherein any word or any phrase in the raw text that has been shortened by dropping one or more letters is replaced with its full form using a contraction resolution tool. The memory (128) further comprises an acronym resolver (106) configured for resolving acronyms in the raw text to generate resolved raw terms by identifying at least one acronym by creating a context window and replacing the identified at least one acronym with corresponding long forms based on regular expression (regex) techniques. The processor (s) (130) further comprise the pre-processor (108) configured for pre-processing the plurality of resolved raw text, wherein the pre-processing comprises at least one of tokenizing, part of speech (POS) tagging, filtering punctuations, filtering stop-words, filtering any excluded POS tags, lemmatizing, filtering domain specific words. The memory (128) further comprises a domain language model (110) that comprises exhaustive vocabulary data to be used during key-term extraction and synonym extraction, wherein the exhaustive vocabulary data is a vector representation of semantic meaning of a term or a word. The memory (128) further comprises a key-term extractor (112) that further includes a basic key-term module (114), a revised key-term module (116) and a final key-term module (118) for extracting key-terms. The memory (128) further comprises a synonym module (120) configured determining a set of synonyms for the identified final set of key-terms using the domain language model (110) or a language model (122). The memory (128) further comprises a display module (124) for displaying the final set of key-terms and the set of synonyms for the identified final set of key-terms. The various modules of the key-term and synonyms extracting system (100) are implemented as at least one of a logically self-contained part of a software program, a self-contained hardware component, and/or, a self-contained hardware component with a logically self-contained part of a software program embedded into each of the hardware component that when executed perform the above method described herein.

According to an embodiment of the disclosure, key-term and synonyms extracting system (100) comprises a raw text extractor (102) configured for extracting, by one or more hardware processors, a plurality of raw text from a plurality of text documents using a plurality of parsing techniques, wherein the plurality of text documents are obtained from a plurality of sources. The raw text is extracted from the text documents using a known text extraction technique that include two column parsing techniques, Optical character recognition (OCR), OCR with pre-defined standard templates of a specific domain, pre-defined standard template based removal wherein the pre-defined boilerplate statement/texts are removed and only relevant content is retained.

In one embodiment, the plurality of text documents obtained from a plurality of sources can be in a variety of formats that include Portable Document Format (PDF), txt (text) format or in document format. During the extraction of raw text from the input documents, a few challenges such as two-column format, text as image (for PDFs) and standard template documents are addressed. Further for two-column format sentence boundaries and cases are identified where a word is split across lines and optionally joined by hyphenating while for documents with standard templates, only specific sections of interest are identified and blank templates are used as to identify relevant phases for further parsing and OCR techniques are used for PDF documents.

According to an embodiment of the disclosure, key-term and synonyms extracting system (100) further comprises the contraction resolver (104) configured for resolving contractions text to obtain a refined raw text, wherein contractions are identified and replaced in the raw text, wherein any word or any phrase in the raw text that has been shortened by dropping one or more letters is replaced with corresponding full form using a contraction resolution tool. The contraction resolution tool comprises of known contraction resolution tools that include regular expression (regex) tools.

According to an embodiment of the disclosure, key-term and synonyms extracting system (100) further comprises the an acronym resolver (106) configured for resolving acronyms in the refined raw text to generate resolved raw terms by identifying atleast one acronym by creating a context window and replacing the identified atleast one acronym with corresponding long forms based on regular expression (regex) techniques. The size of the context window is dynamically determined using a plurality of parameters comprising a length of the at least one identified acronym, a pre-determined average length of word and a pre-defined buffer character. The acronym resolver identifies an acronym to convert it into its expanded form by resolving the acronyms into its corresponding long form. In an embodiment, a use case example of resolving acronyms can be illustrated with the raw text "Tata Consultancy Services (TCS)", wherein wherever the word "TCS" is repeated in a document, it would be identified and replaced with the acronym "Tata Consultancy Services".

In one embodiment, the process of acronym resolution includes identifying atleast one acronym by creating a context window and replacing the identified atleast one acronym with corresponding long forms. The size of the context window is dynamically determined using a plurality of parameters comprising a length of the at least one identified acronym, a pre-determined domain specific average length of a word and a pre-defined buffer character, which can be represented as shown below;

$$S_C = L_A + \text{Avg } L_A + \text{Buffer}$$

Where
$S_C$ is the size of the context window
$L_A$ is the length of the acronym Avg $L_A$—pre-determined domain specific average length of a word Buffer is the pre-defined buffer character For acronym resolution, atleast one acronym is identified, wherein in an embodiment, words in all Caps (or separated by a '.' or ' ') are first identified. Further size of the context window is dynamically determined (using the above explained size of the context window) for identifying the long forms of the identified acronyms, for each of the places where the acronyms are present the text of length context window from both left and right side of the acronym id identified and then the long form (that is group of words starting with letters of the acronym) is identified. Further of all the selected long-forms, the one which is longest after removing stopwords is selected so that all the acronyms are then replaced by the long-forms.

According to an embodiment of the disclosure, the key-term and synonyms extracting system (100) further comprises the pre-processor (108) configured for pre-processing the plurality of resolved raw text, wherein the pre-processing comprises atleast one of tokenizing, part of speech (POS) tagging, filtering punctuations, filtering stop-words, filtering any excluded POS tags, lemmatizing, filtering domain specific words.

In one embodiment, the process of for pre-processing the plurality of resolved raw text comprises of several techniques that are explained below. Further any extra whitespaces are removed from the resolved raw text and only single white spaces are retained between words in the resolved raw text. Further using a Web filter, links (https/http/ftp) are removed. Further tokenization of words and sentences is performed using know specific language parsers. Further Part-of-Speech techniques are applied to the raw text and all terms that are smaller than a pre-defined threshold are removed as deemed to be less informative, wherein the pre-defined threshold could be "2" in an embodiment. Further the raw text is converted to its the lemmatized form, where in words like 'studies' and 'studying' get converted to its lemmatized form 'study'. Further any punctuations and certain words which occur too often in the patent domain and are far too general (found experimentally) are also discarded. The pre-processed text at this point is list of 'word/POS-tag' string where each of the sentences are separated by 'ENDSENTENCE/NN'.

According to an embodiment of the disclosure, the key-term and synonyms extracting system (100) further comprises the domain language model (110) that comprises exhaustive vocabulary data to maybe used during key-term extraction and synonym extraction, wherein the exhaustive vocabulary data is a vector representation of semantic meaning of a term or a word. The domain language model (110) is selected from existing domain language models that include Word2Vec.

In one embodiment, the domain language model (110) is a Word2Vec model trained on domain corpus of 1.5 mn documents with a vocabulary size of 2.6 mn terms (words and phrases) and 256 dimensions. The 256 dimensions for each term is a vector representation of the "Semantic meaning" of the term. The domain language model (110) domain model is used for relevancy scoring adjustment and synonyms extraction also.

According to an embodiment of the disclosure, the key-term and synonyms extracting system (100) further comprises the key-term extractor (112) that further includes the basic key-term module (114), the revised key-term module (116) and the final key-term module (118) for extracting key-terms. Each of the basic set of key-terms comprises of a plurality of key-phrases and a plurality of keywords that is an n-gram term comprising one of uni-gram, bi-gram and tri-gram, wherein each of the basic set of key-terms is extracted based on the key-term extraction technique. The disclosed the key-term and synonyms extracting system is a letter case independent method, wherein the key-term and synonyms extracting system is implemented using the disclosed techniques irrespective of the letter case (lower and upper case) of the raw test.

The basic key-term module (114) in the key-term extractor (112) configured for extracting a basic set of key-terms and a frequency score corresponding to each of the basic set of key-terms from the pre-processed text based on a key-term extraction technique.

The revised key-term module (116) in the key-term extractor (112) is configured for determining a revised set of key-terms from the basic set of key-terms and a relevancy score from the frequency score corresponding to each of the revised set of key-terms using a reconciliation techniques based on the domain language model.

The final key-term module (118) in the key-term extractor (112) is configured for identifying a final set of key-terms from the revised set of key-terms based on the relevancy score, wherein the revised set of key-terms are sorted based on the relevancy score to generate the final set of key-terms.

In one embodiment, the basic key-term module (114) in the key-term extractor (112) is configured for extracting a basic set of key-terms and a frequency score corresponding to each of the basic set of key-terms from the pre-processed text based on a key-term extraction technique. The disclosed key-term extraction techniques are implemented based on known key-term extraction techniques that include collocations, noun phrases, basic parsers based on neural networks. Each of the extracted basic set of key-terms comprises of a plurality of key-phrases and a plurality of keywords that is an n-gram term comprising one of uni-gram, bi-gram and tri-gram, wherein each of the basic set of key-terms is extracted based on the key-term extraction technique.

Considering a use case example to illustrate the bi-gram and the tri-gram, represented as Tri-collocs and Bi-collocs below;

Tri-collocs are of the form (('word/tag', 'word/tag', 'word/tag'), frequency) an example for which is represented as: (('information/NN', 'technology/NN', 'service/NNS'), frequency).

Bi-collocs are of the form: (('word/tag', 'word/tag'), frequency) an example for which is represented as: (('information/NN', 'technology/NN'), frequency).

In one embodiment, the revised key-term module (116) in the key-term extractor (112) is configured determining a revised set of key-terms from the basic set of key-terms and a relevancy score from the frequency score corresponding to each of the revised set of key-terms using a reconciliation techniques based on a domain language model. The reconciliation techniques is to be applied on the key-phrases in the basic set of key-terms. The reconciling process includes iteratively reconciling any repeated terms in each bi-gram to remove the repeated terms in the bi-grams and the tri-grams. The reconciling process identifies bi-grams and tri-grams and merges the bi-grams and the tri-grams as well as words with phrases while adjusting the relevancy score.

Figure 2:
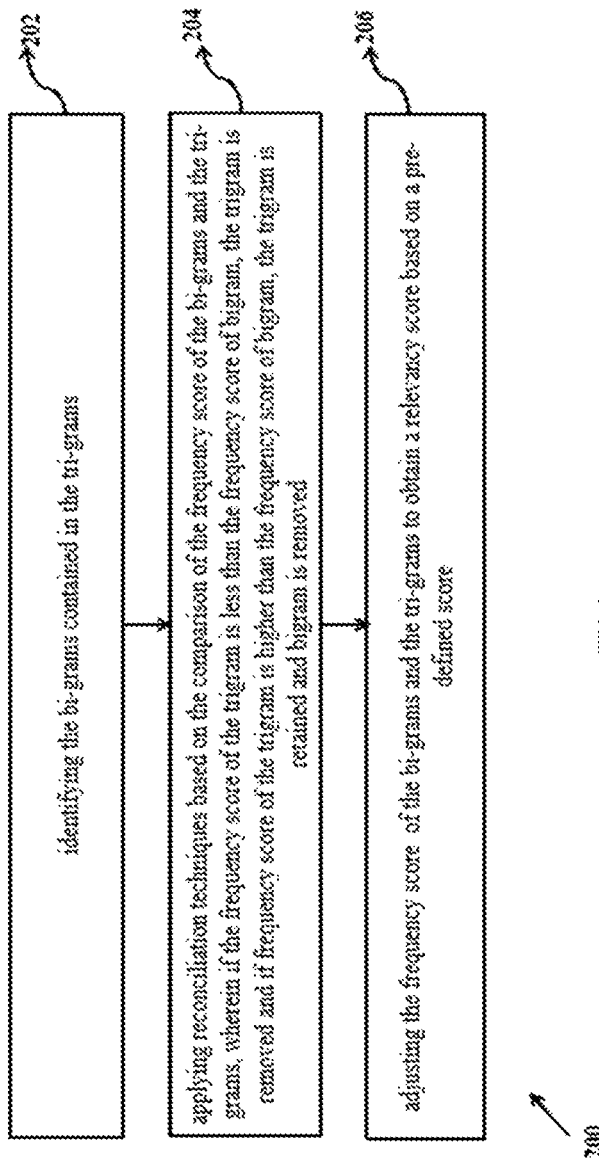
FIG. 2 is an exemplary flow diagram for a reconciliation technique implemented by the system of FIG. 1, according to some embodiments of the present disclosure.
Figure 3:
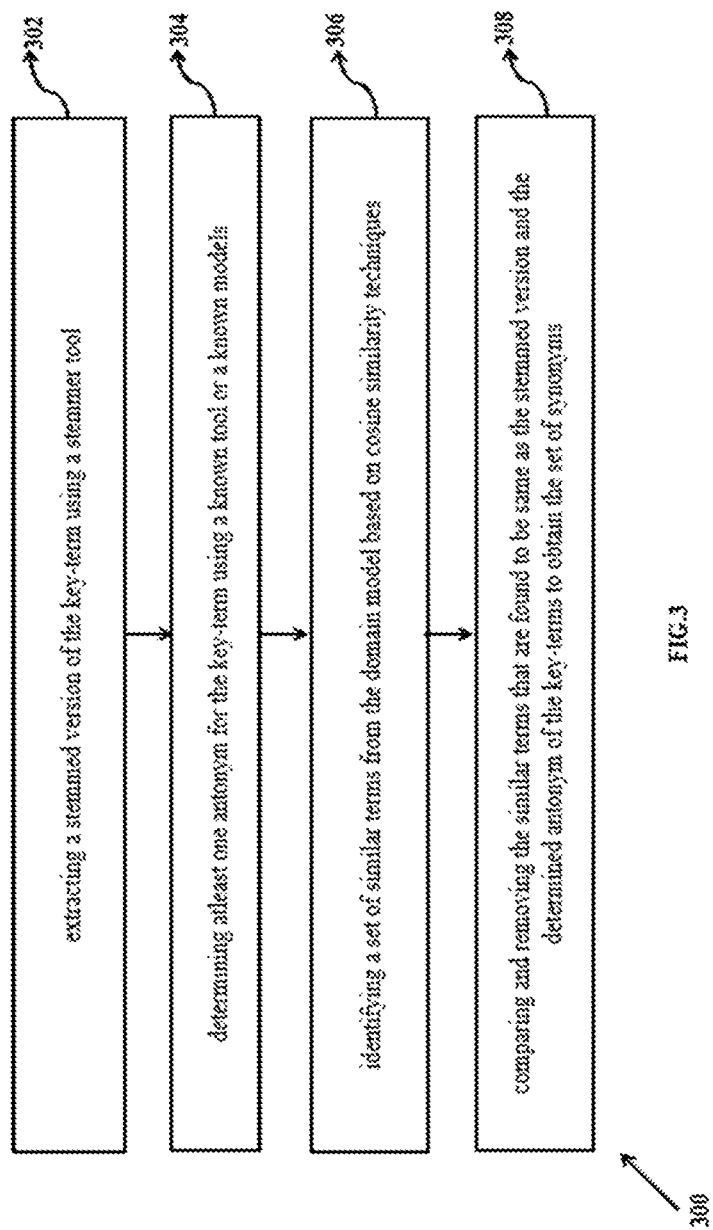
FIG. 3 is an exemplary flow diagram for determining a set of synonyms for the identified final set of key-terms during availability of the domain language model implemented by the system of FIG. 1, according to some embodiments of the present disclosure.
Figure 4:
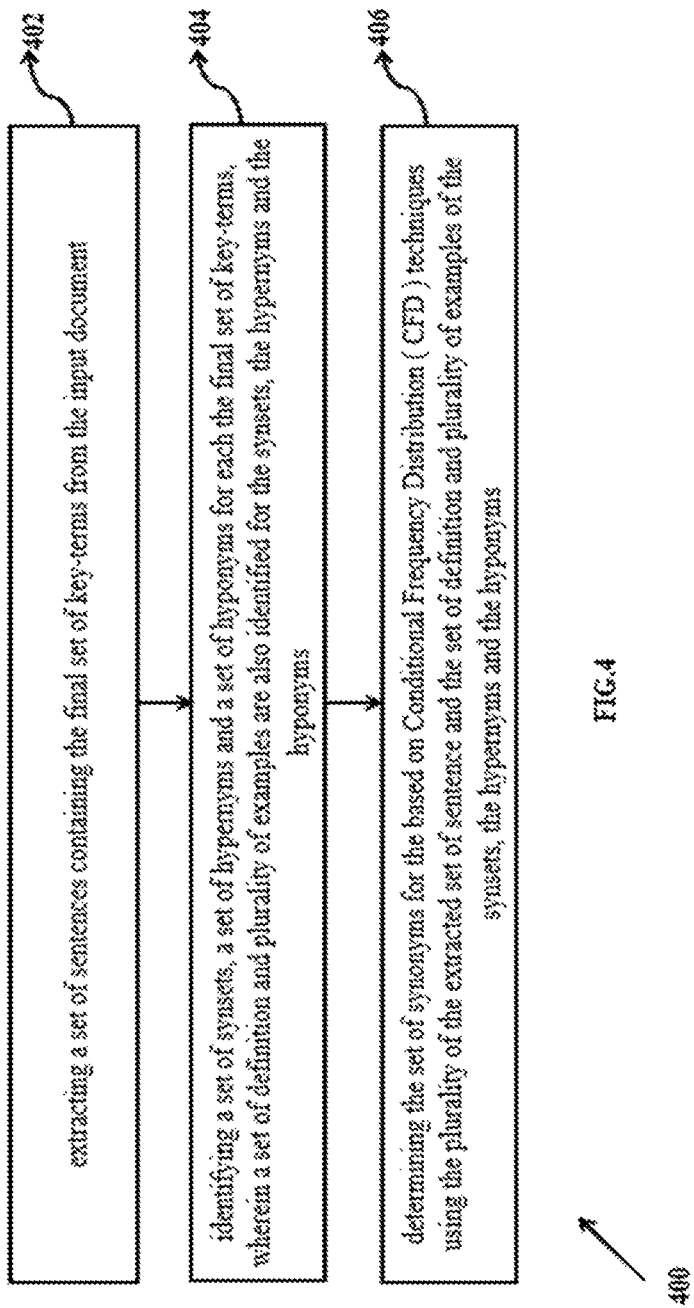
FIG. 4 is an exemplary flow diagram for determining a set of synonyms for the identified final set of key-terms during availability of the language model implemented by the system of FIG. 1, according to some embodiments of the present disclosure.

In one embodiment, FIG. 2 is an exemplary flow diagram for a reconciliation technique implemented by the system of FIG. 1 and includes the following steps;

At step (202), the method (200) includes identifying the bi-grams contained in the tri-grams. In an embodiment, if a bi-gram "containing" ENDSENTENCE/NN is identified then it is discarded from the list of the basic set of key-terms as it is considered to be a word. Similarly, in case of tri-gram if 'ENDSENTENCE/NN' comes then it will be covered as a bi-colloc hence discarded. Further POS-tags are discarded from the basic set of key-terms as a bi-gram may become empty or just a single word and a tri-gram may become empty or convert to bi-gram or word and accordingly gets processes as regular word or phrase.

At the next step (204), the method (200) includes applying reconciliation techniques based on the comparison of the frequency score of the bi-grams and the tri-grams, wherein if the frequency score of the trigram is less than the frequency score of bigram, the trigram is removed and if frequency score of the trigram is higher than the frequency score of bigram, the trigram is retained and bigram is removed.

At the next step (206), the method (200) includes adjusting the frequency score of the bi-grams and the tri-grams to obtain a relevancy score based on the frequency scores of the bi-grams and the tri-grams.

In an embodiment, considering an example case of a tri-gram "Information Technology Services" with a frequency score of 10 and bi-gram "Information Technology" with frequency score of 20, the word "Services" with a frequency score of 5, then the bi-gram "Information Technology" is retained—the trigram is discarded while the frequency score of bi-gram and word is updated with frequency score of tri-gram and words to obtain the relevancy score of 30 (20+10) and "Services" word to obtain the relevancy score of 15 (10+5=15).

Further post reconciliation, in case of availability of the domain language model for the key-phrase then a first dynamic penalty score is applied for the frequency score during wherein the first dynamic penalty score is defined based on the logarithmic value of frequency score of the key-phrase in the domain language model which is expressed as shown below;

$$\text{First dynamic penalty score} = \text{frequency\_score}_{key\text{-}phrase}/\log(\text{frequency\_score}_{domain\ language\ model}).$$

Further in case of phrases not found in the domain language model (110), the phrase is split into constituent words and if one or more of the words are not found in vocab, then score remains as is, however if all the constituent words are found in the vocab then their respective cosine similarities are stored in a first list (phrase_sim) list and their frequencies in the model stores in a second list (phrase_count) which is expressed as shown below;

$$\text{Second dynamic penalty score} = \text{frequency}_{score_{key\text{-}phrase}}/\log(\text{avg}(\text{phase}_{sim}))*\text{avg}(\text{phase\_count})$$

Further for the non-availability of the domain language model for the key-phrase, a dynamic penalty score for the frequency score is applied, wherein the dynamic penalty score is estimated using similarity between its key-phrase in the document which is expressed as shown below;

$$\text{Dynamic penalty score} = \text{frequency\_score}_{key\text{-}phrase}$$

In one embodiment, the final key-term module (112) in the key-term extractor (118) is configured for identifying a final set of key-terms from the revised set of key-terms based on the relevancy score, wherein the revised set of key-terms are sorted based on the relevancy score to generate the final set of key-terms. In an embodiment the revised set of key-terms are sorted based on the relevancy score using sorting techniques wherein a basic sorting in descending order is implemented for the relevancy scores to generate the final set of key-terms.

According to an embodiment of the disclosure, the key-term and synonyms extracting system (100) further comprises the synonym module (120) for configured determining a set of synonyms for the identified final set of key-terms based on the domain language model (110) or a language model (122). The disclosed key-term and synonyms extracting system is a letter case independent method, wherein the key-term and synonyms extracting system is implemented using the disclosed techniques irrespective of the letter case (lower and upper case) of the raw test.

The set of synonyms are determined for the identified final set of key-terms during availability of the domain language model (110) or the language model (122), wherein based on the availability of the a particular model for the final set of key-terms, the set of synonyms are determined as explained below.

In one embodiment, is an exemplary flow diagram for determining a set of synonyms for the identified final set of key-terms during availability of the domain language model implemented by the system of FIG. 1 and includes the following steps.

At step (302), the method (300) includes extracting a stemmed version of the key-term using a stemmer tool. In an embodiment, stemmer tools used for extracting a stemmed version of the key-term include known tools such as SnowballStemmer.

At the next step (304), the method (300) includes determining at least one antonym for the key-term using a known tool or a known model.

At the next step (306), the method (300) includes identifying a set of similar terms from the domain language model based on cosine similarity techniques. In an embodiment, a pre-defined value of "0.5" estimated based on cosine similarity techniques) is used as threshold value for identifying a set of similar terms from the domain language model.

At the next step (308), the method (300) includes comparing and removing the similar terms that are found to be same as the stemmed version and the determined antonym of the key-terms to obtain the set of synonyms.

In one embodiment, is an exemplary flow diagram for determining a set of synonyms for the identified final set of key-terms during availability of the language model implemented by the system of FIG. 1 and includes the following steps;

At step (402), the method (400) includes extracting a set of sentences containing the final set of key-terms from the input document.

At the next step (404), the method (400) includes identifying a set of synsets, a set of hypernyms and a set of hyponyms for each the final set of key-terms, wherein a set of definition and plurality of examples are also identified for the synsets, the hypernyms and the hyponyms. A set of synsets, a set of hypernyms and a set of hyponyms for each the final set of key-terms is identified using the language model. In an embodiment, the language model includes known models such as Wordnet model.

At the next step (406), the method (400) includes determining the set of synonyms for the based on Conditional Frequency Distribution CFD) techniques using the plurality of the extracted set of sentences (from step 402) and the set of definition and plurality of examples of the synsets, the hypernyms and the hyponyms (from step 404).

Considering an example scenario to illustrate the acronym resolution, pre-processing, key word extraction & synonym extraction using a raw text shown below:

Raw Text:
"Detection of Lane marking using visual information is a primary requirement for supporting driver assistance and safety features such as Lane Departure Warning (LDW), Lane Keep Assistance (LKA) and Forward Collision Alert (FCA). For detecting lane markings, cameras with clear sensors or color filtered sensors are used [1]. For LDW and LKA applications, a vision sensor, i.e., camera is mounted in front of the vehicle to capture the road images. The camera is an assembly of a CMOS/CCD sensor of size VGA or HD used along with a lens of horizontal field of view (FOV) around 45 degree and vertical FOV of around 30 degree. The lane markings may vary in color (white and yellow for India, USA, Europe; Blue for South Korea), width and shape (solid and dashed). Different techniques to detect lanes include edge detection and line approximations to the edges and using global segmentation techniques. Wang et al. [2] proposed dividing the image region into sub regions and fitting Hough lines to the edges in each sub regions and therefore determining the vanishing point. Borkar [3] and Taubel et al. [4] suggested inverse perspective mapping of the image, detecting the lane marks by thresholding and then fitting Hough lines. Sachin et al. [5] and Ngouh et al. [6] and Lim et al. [7] recommended to use thresholding methods to extract the road lane markings. The aforementioned algorithms perform well in the near view of the road and straight lane markings. Moreover, the methods generally approximates/estimates the location of the lane. To support the practical scenarios of lane detection, improved detection distance and detection of shapes like curvy and dashed lane markings need to be addressed. Although Chellappa et al. [8] proposed a learning based approach to detect and track the lane markings, there is a need to have a self-adaptive unsupervised algorithm from the accuracy and performance point of view as far as the embedded platforms used in vehicles are concerned. Here, we propose a novel method to detect the lane markings at farther distances by detecting the curved, straight lanes which are solid or dashed, using the pixel intensity and edge information to identify the lane markings reliably. In order to achieve accurate inbounds of the lane, the lane marking masks from spatial lane stripes and edges from the entire arbitrary frame are determined along with their mutual correspondence. For this purpose, we need to detect continuous and accurate lane edges and masks."

The raw text after acronym resolution is as shown below;
After Acronym Resolution
Detection of Lane marking using visual information is a primary requirement for supporting driver assistance and safety features such as Lane Departure Warning, Lane Keep Assistance and Forward Collision Alert. For detecting lane markings, cameras with clear sensors or color filtered sensors are used [1]. For Lane Departure Warning and Lane Keep Assistance applications, a vision sensor, i.e., camera is mounted in front of the vehicle to capture the road images. The camera is an assembly of a CMOS/CCD sensor of size VGA or HD used along with a lens of horizontal field of view around 45 degree and vertical field of view of around 30 degree. The lane markings may vary in color (white and yellow for India, USA, Europe. Blue for South Korea), width and shape (solid and dashed). Different techniques to detect lanes include edge detection and line approximations to the edges and using global segmentation techniques. Wang et al. [2] proposed dividing the image region into sub regions and fitting Hough lines to the edges in each sub regions and therefore determining the vanishing point. Borkar [3] and Taubel et al. [4] suggested inverse perspective mapping of the image, detecting the lane marks by thresholding and then fitting Hough lines. Sachin et al. [5] and Ngouh et al. [6] and Lim et al. [7] recommended to use thresholding methods to extract the road lane markings. The aforementioned algorithms perform well in the near view of the road and straight lane markings. Moreover, the methods generally approximates/estimates the location of the lane. To support the practical scenarios of lane detection, improved detection distance and detection of shapes like curvy and dashed lane markings need to be addressed. Although Chellappa et al. [8] proposed a learning based approach to detect and track the lane markings, there is a need to have a self_adaptive unsupervised algorithm from the accuracy and performance point of view as far as the embedded platforms used in vehicles are concerned. Here, we propose a novel method to detect the lane markings at farther distances by detecting the curved, straight lanes which are solid or dashed, using the pixel intensity and edge information to identify the lane markings reliably. In order to achieve accurate inbounds of the lane, the lane marking masks from spatial lane stripes and edges from the entire arbitrary frame are determined along with their mutual correspondence. For this purpose, we need to detect continuous and accurate lane edges and masks. The proposed algorithm has been validated on TCS created database and standard Caltech Lanes Dataset [9]

The raw text after pre-processing is as shown below;

After Preprocessing detection/NN lane/NN mark/VBG visual/JJ information/NN primary/JJ requirement/NN support/VBG driver/NN assistance/NN safety/NN feature/NNS lane/JJ departure/NN warning/NN lane/JJ assistance/NN forward/JJ collision/NN alert/NN ENDSENTENCE/NN detect/VBG lane/JJ marking/NNS camera/NNS clear/JJ sensor/NNS color/NN filter/VBN sensor/NNS ENDSENTENCE/NN lane/JJ departure/NN warning/NN lane/NN assistance/NN vision/NN sensor/NN ENDSENTENCE/NN ENDSENTENCE/NN camera/NN mount/VBN front/NN vehicle/NN capture/VB road/NN image/NNS ENDSENTENCE/NN camera/NN assembly/NN cmos/NN ccd/NN sensor/NN size/NN vga/NN lens/NNS horizontal/JJ view/NN degree/NN vertical/JJ view/NN degree/NN ENDSENTENCE/NN lane/JJ marking/NNS vary/VB color/NN white/JJ yellow/JJ india/NN usa/JJ europe/VB ENDSENTENCE/NN blue/NN south/JJ korea/NN width/JJ shape/NN solid/JJ dash/VBD ENDSENTENCE/NN technique/NNS detect/VB lane/NNS include/VBP detection/NN line/NN approximation/NNS global/JJ segmentation/NN technique/NNS ENDSENTENCE/NN wang/NN ENDSENTENCE/NN divide/VBG image/NN region/NN region/NNS fit/VBG hough/JJ line/NNS region/NNS determine/VBG vanishing/NN point/NN ENDSENTENCE/NN borkar/NN taubel/NN ENDSENTENCE/NN suggest/VBD inverse/JJ perspective/NN mapping/NN image/NN detect/VBG lane/NN mark/NNS thresholding/VBG fit/VBG hough/NN line/NNS ENDSENTENCE/NN sachin/JJ ENDSENTENCE/NN ngouh/JJ ENDSENTENCE/NN lim/JJ ENDSENTENCE/NN recommend/VBD thresholding/VBG method/NNS extract/VB road/NN lane/NN marking/NNS ENDSENTENCE/NN aforementioned/JJ algorithm/NN perform/VB near/NN view/NN road/NN straight/JJ lane/NN marking/NNS ENDSENTENCE/NN method/NNS estimate/VBZ location/NN lane/NN ENDSENTENCE/NN support/VB practical/JJ scenario/NNS lane/NN detection/NN improve/VBN detection/NN distance/NN detection/NN shape/NNS curvy/NN dash/VBD lane/NN marking/NNS address/VBN ENDSENTENCE/NN chellappa/JJ ENDSENTENCE/NN learning/NN base/VBN approch/NN detect/VB track/VB lane/NN marking/NNS unsupervised/JJ algorithm/NN accuracy/NN performance/NN point/NN view/NN embedded/JJ platform/NNS vehicle/NNS concerned/JJ ENDSENTENCE/NN method/NN detect/VB lane/NN marking/NNS farther/NN distance/NNS detect/VBG curve/VBN straight/JJ lane/NNS solid/JJ dash/VBN pixel/NN intensity/NN information/NN identify/VB lane/NN marking/NNS ENDSENTENCE/NN order/NN accurate/JJ inbounds/NNS lane/NN lane/NN mark/VBG mask/NNS spatial/JJ lane/NN stripe/NNS entire/JJ arbitrary/JJ frame/NN determine/VBN mutual/JJ correspondence/NN EN DSENTENCE/NN purpose/NN detect/VB continuous/JJ accurate/JJ lane/NN mask/NNS ENDSENTENCE/NN algorithm/NN validate/VBN create/VBN database/NN standard/JJ caltech/NN lane/NNS dataset/VBD ENDSENTENCE/NN The basic set of key-terms (bi-grams and tri-grams) extracted is as shown below;

Trigram Collocations:

lane/JJ_departure/NN_warning/NN, accurate/JJ_inbounds/NNS_lane/NN, accurate/JJ_lane/NN_mask/NNS, detect/VBG_curve/VBN_straight/JJ, detect/VBG_lane/JJ_marking/NNS, detect/VBG_lane/NN_mark/NNS, hough/JJ_line/NNS_region/NNS, lane/NNS_solid/JJ_dash/VBN, mask/NNS_spatial/JJ_lane/NN, shape/NNS_curvy/NN_dash/VBD Bigram Collocations:

'lane/NN_marking/NNS, departure/NN_warning/NN, lane/JJ_departure/NN, accurate/JJ_inbounds/NNS, accurate/JJ_lane/NN, detect/VBG_curve/VBN, driver/NN_assistance/NN, hough/JJ_line/NNS, learning/NN_base/VBN, marking/NNS_camera/NNS, pixel/NN_intensity/NN, sensor/NNS_color/NN, straight/JJ_lane/NNS'

The revised set of key-terms from the basic set of key-terms and a relevancy score using the reconciliation techniques is as shown below;

Reconciled Collocations:

lane marking, lane departure warning, horizontal view degree, accuracy performance point, accurate inbounds lane, accurate lane mask, aforementioned algorithm perform, approximation global segmentation, assistance forward collision, assistance safety feature, assistance vision sensor, blue south korea, camera front, camera clear sensor, road image, forward collision alert, color sensor, color white yellow, database standard, straight lane, curvy lane, pixel intensity, degree vertical view, detection distance, detection line approximation, detection shape curvy, vanishing point, image region, embedded platform vehicle, location lane, road lane, hough line, front vehicle, india usa, information primary requirement, inverse perspective mapping, lane stripe entire, lane solid, practical scenario lane, road straight lane, shape solid.

The set of synonyms determined for the key-terms of the raw text is as shown below;

Synonyms:

lane marking OR traffic lane OR road lane OR lane vehicle OR road marking OR lane line According to an embodiment of the disclosure, the key-term and synonyms extracting system (100) further comprises the display module (124) for configured displaying the final set of key-terms and the set of synonyms for the identified final set of key-terms.

FIG. 5A and FIG. 5B, with reference to FIG. 1, is an exemplary flow diagram illustrating a method (500) for time lag identification in an industry using the system (100) of FIG. 1 according to an embodiment of the present disclosure.

In an embodiment, the system (100) comprises one or more data storage devices or the memory (128) operatively coupled to the processor(s) (130) and is configured to store instructions for execution of steps of the method 600 by the processor(s) or one or more hardware processors 130. The steps of the method of the present disclosure will now be explained with reference to the components of the key-term and synonyms extracting system (100) and the modules (102-124) as depicted in FIG. 12, and the flow diagrams as depicted in FIG. 5A and FIG. 5B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 502 of the method (500), the one or more hardware processors 130 are configured to extract a plurality of raw text from a plurality of text documents using a plurality of parsing techniques in the raw text extractor (102), wherein the plurality of text documents are obtained from a plurality of sources. In an embodiment, plurality of parsing techniques includes Optical Character Recognition (OCR), Portable Document Format (PDF), two-column technique and template-based technique At step 502 of the method (500), the one or more hardware processors 130 are configured to resolve contractions in the contraction resolver (104), wherein contractions are identified and replaced in the raw text to obtain a refined raw text, wherein any word or any phrase in the raw text that has been shortened by dropping one or more letters is replaced with corresponding full form using a contraction resolution tool. In an embodiment, the contraction resolution tool comprises of known contraction resolution tools that include regular expression (regex) tools.

In the next step at 506, the method (500), the one or more hardware processors 130 are configured to resolve acronyms in the refined raw text in the acronym resolver (106) to generate resolved raw terms by identifying atleast one acronym by creating a context window and replacing the identified atleast one acronym with corresponding long forms based on regular expression (regex) techniques. The size of the context window is dynamically determined using a plurality of parameters comprising a length of the at least one identified acronym, a pre-determined average length of word and a pre-defined buffer character.

In the next step at 508, the method (500) the one or more hardware processors 130 are configured to pre-process the plurality of resolved raw text in the pre-processor (108), wherein the pre-processing comprises atleast one of tokenizing, part of speech (POS) tagging, filtering punctuations, filtering stop-words, filtering any excluded POS tags, lemmatizing, filtering domain specific words.

In the next step at 510, the method (500) the one or more hardware processors 130 are configured to extract a basic set of key-terms and a frequency score corresponding to each of the basic set of key-terms from the pre-processed text based on a key-term extraction technique in the basic key-term module (114) of the key-term extractor (112), wherein the extracted basic set of key-terms includes a plurality of keywords and a plurality of key-phrases comprising of a plurality of an n-gram terms. Each of the basic set of key-terms is an n-gram term comprising one of uni-gram, bi-gram and tri-gram, wherein each of the basic set of key-terms is extracted based on the key-term extraction technique.

In the next step at 512, the method (500) the one or more hardware processors 130 are configured to determine a revised set of key-terms in the revised key-term module (116) of the key-term extractor (112) from the basic set of key-terms and a relevancy score from the frequency score corresponding to each of the revised set of key-terms using a plurality reconciliation techniques based on a domain language model, wherein, the plurality reconciliation techniques include the reconciliation techniques to be applied on the key-phrases in the basic set of key-terms.

In an embodiment, the reconciliation techniques to be applied on the key-phrases in the basic set of key-terms is implemented as several steps that include identifying the bi-grams contained in the tri-grams. The reconciliation techniques further includes applying reconciliation techniques based on the comparison of the frequency score of the bi-grams and the tri-grams, wherein if the frequency score of the trigram is less than the frequency score of bigram, the trigram is removed and if frequency score of the trigram is higher than the frequency score of bigram, the trigram is retained and bigram is removed. The reconciliation techniques further include adjusting the frequency score of the bi-grams and the tri-grams to obtain a relevancy score based on a pre-defined score. Further post reconciliation, in case of availability of the domain language model for the key-phrase then a first dynamic penalty score is applied for the frequency score during wherein the first dynamic penalty score is defined based on the logarithmic value of frequency score of the key-phrase in the domain language model. Further for the non-availability of the domain language model for the key-phrase, a dynamic penalty score for the frequency score is applied, wherein the dynamic penalty score is estimated using similarity between its key-phrase in model the document.

In the next step at 514, the method (500) includes identifying a final set of key-terms from the revised set of key-terms in the final key-term module (118) of the key-term extractor (112) based on the relevancy score, wherein the revised set of key-terms are sorted based on the relevancy score to generate the final set of key-terms.

In the next step at 516, the method (500) includes determining a set of synonyms for the identified final set of key-terms in the synonym module (120) based on the domain language model (110) or a language model (122) corresponding to the identified final set of key-terms.

In an embodiment, determining a set of synonyms for the identified final set of key-terms during availability of the domain language model is implemented as several steps that includes extracting a stemmed version of the key-term using a stemmer tool. The domain language model based determining a set of synonyms further includes determining atleast one antonym for the key-term using a known tool or a known-models. The domain language model based determining a set of synonyms further includes identifying a set of similar terms from the domain language model based on cosine similarity techniques. The domain language model based determining a set of synonyms further includes comparing and removing the similar terms that are found to be same as the stemmed version and the determined antonym of the key-terms to obtain the set of synonyms.

In an embodiment, determining a set of synonyms for the identified final set of key-terms during availability of the language model is implemented as several steps that includes extracting a set of sentences containing the final set of key-terms from the input document. The language model based determining a set of synonyms further includes identifying a set of synsets, a set of hypernyms and a set of hyponyms for each the final set of key-terms, wherein a set of definition and plurality of examples are also identified for the synsets, the hypernyms and the hyponyms. The domain language model based determining a set of synonyms further includes determining the set of synonyms for the based on Conditional Frequency Distribution (CFD) techniques using the plurality of the extracted set of sentences and the set of definition and plurality of examples of the synsets, the hypernyms and the hyponyms.

In the next step at 516, the method (500) includes displaying the final set of key-terms and the set of synonyms for the identified final set of key-terms in the display module (124).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Hence a method and a system for time lag identification in an industry is provided. The method discloses to extract key-terms and further determine a set of relevant synonyms for the extracted key-terms, wherein the key-terms is a collection of small sub-set of words and phrases which are individually meaningful and collectively provide a generic context of the given input text. The method discloses techniques for extraction of key-terms is independent of any specific supervised training and does not require a huge amount of training data. The key-terms are determined in several stages using frequency based techniques based on a relevancy scoring of the key-terms. Further a set of synonyms are determined for the identified key-terms based on a language-based approach or domain language specific approach.

It is to be understood that the scope of the protection is extended to such a program and in addition to a computer-readable means having a message there in; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A processor-implemented method (500) for extraction of key-terms and synonyms for the key-terms, the method comprising:

extracting, by one or more hardware processors, a raw text from a plurality of text documents using a plurality of parsing techniques, wherein the plurality of text documents is obtained from a plurality of sources (502);

resolving contractions, wherein the contractions are identified and replaced in the raw text to obtain a refined raw text, wherein any word or any phrase in the raw text that has been shortened by dropping one or more letters is replaced with corresponding full form using a contraction resolution tool (504);

resolving acronyms in the refined raw text to generate resolved raw terms by identifying atleast one acronym by creating a context window and replacing the identified atleast one acronym with corresponding long forms based on regular expression (regex) techniques (506);

pre-processing the plurality of resolved raw text to obtain a pre-processed text, wherein the pre-processing comprises atleast one of tokenizing, part of speech (POS) tagging, filtering punctuations, filtering stop-words, filtering any excluded POS tags, lemmatizing, filtering domain specific words (508);

extracting a basic set of key-terms and a frequency score, corresponding to each of the basic set of key-terms, from the pre-processed text based on a key-term extraction technique, wherein the extracted basic set of key-terms includes a plurality of keywords and a plurality of key-phrases comprising of a plurality of an n-gram terms (510);

determining a revised set of key-terms from the basic set of key-terms and a relevancy score from the frequency score, corresponding to each of the revised set of key-terms, using a reconciliation technique based on a domain language model (512);

identifying a final set of key-terms from the revised set of key-terms based on the relevancy score, wherein the revised set of key-terms are sorted based on the relevancy score to generate the final set of key-terms (514);

determining a set of synonyms for the identified final set of key-terms based on the domain language model or a language model corresponding to the identified final set of key-terms (516), wherein for determining a set of synonyms for the identified final set of key-terms during availability of the domain language model comprising steps of:

extracting a stemmed version of the key-term using a stemmer tool (302);

determining at least one antonym for the key-term using a known tool or a known model (304);

identifying a set of similar terms from the domain language model based on cosine similarity techniques (306); and comparing and removing the similar terms that are found to be same as the stemmed version and the determined antonym of the key-terms to obtain the set of synonyms (308); and displaying the final set of key-terms and the set of synonyms for the identified final set of key-terms (518).

2. The method of claim 1, wherein the key-terms comprise a plurality of key words and a plurality of key-phrases, wherein the key-terms is a collection of small sub-set of words and phrases from the plurality of text document, which are individually meaningful and collectively provide a generic context of the given input text.

3. The method of claim 1, wherein size of the context window is dynamically determined using a plurality of parameters comprising a length of the at least one identified acronym, a pre-determined average length of word and a pre-defined buffer character.

4. The method of claim 1, wherein each of the basic set of key-terms comprises a plurality of key-phrases and a plurality of keywords that is an n-gram term comprising one of uni-gram, bi-gram and tri-gram, and wherein each of the basic set of key-terms is extracted based on key-term extraction techniques that include collocations and noun phrases techniques.

5. The method of claim 4, the reconciliation techniques to be applied on the key-phrases in the basic set of key-terms comprise the steps of:

identifying the bi-grams contained in the tri-grams (202);

applying reconciliation techniques based on the comparison of the frequency score of the bi-grams and the tri-grams, wherein if the frequency score of the trigram is less than the frequency score of bigram, the trigram is removed and if frequency score of the trigram is higher than the frequency score of bigram, the trigram is retained and bigram is removed (204); and adjusting the frequency score of the bi-grams and the tri-grams to obtain a relevancy score based on a pre-defined score (206).

6. The method of claim 5, further includes applying a first dynamic penalty score for the frequency score for the availability of the domain language model for the key-phrase, wherein the first dynamic penalty score is defined based on the logarithmic value of frequency score of the key-phrase in the domain language model.

7. The method of claim 5, further comprising applying a second dynamic penalty score for the frequency score for the non-availability of the domain language model for the key-phrase, using similarity between its key-phrase from the text documents.

8. The method of claim 5, further includes applying a third dynamic penalty score for the frequency score for the availability of the domain language model for the keyword, wherein the third dynamic penalty score is defined based logarithmic value of frequency score of the keyword in the domain language model.

9. The method of claim 1, for determining a set of synonyms for the identified final set of key-terms during availability of the language model comprising steps of:

extracting a set of sentences containing the final set of key-terms from the input document (402);

identifying a set of synsets, a set of hypernyms and a set of hyponyms for each the final set of key-terms, wherein a set of definition and plurality of examples are also identified for the synsets, the hypernyms and the hyponyms (404); and determining the set of synonyms for the based on Conditional Frequency Distribution (CFD) techniques using the plurality of the extracted set of sentences and the set of definition and plurality of examples of the synsets, the hypernyms and the hyponyms (406).

10. A key-term and synonyms extracting system (100) for extraction of key-terms and synonyms for the key-terms, the system (100) comprising:

a memory (128) storing instructions;

one or more Input/Output (I/O) interfaces (126); and one or more hardware processors (130) coupled to the memory (128) via the one or more I/O interfaces (126), wherein the one or more hardware processors (130) are configured by the instructions to implement:

a raw text extractor (102) configured to extract a plurality of raw text from a plurality of text documents using a plurality of parsing techniques, wherein the plurality of text documents is obtained from a plurality of sources;

a contraction resolver (104) configured to resolve contractions, wherein contractions are identified and replaced in the raw text, wherein any word or any phrase in the raw text that has been shortened by dropping one or more letters is replaced with its full form using a contraction resolution tool;
an acronym resolver (106) configured to resolve acronyms in the raw text to generate resolved raw terms by identifying atleast one acronym by creating a context window and replacing the identified atleast one acronym with corresponding long forms based on regular expression (regex) techniques;
a pre-processor (108) configured to pre-process the plurality of resolved raw text, wherein the pre-processing comprises atleast one of tokenizing, part of speech (POS) tagging, filtering punctuations, filtering stop-words, filtering any excluded POS tags, lemmatizing, filtering domain specific words;
a key-term extractor (112) that further comprises:
  a basic key-term module (114) configured for extracting a basic set of key-terms and a frequency score corresponding to each of the basic set of key-terms from the pre-processed text based on a key-term extraction technique;
  a revised key-term module (116) configured for determining a revised set of key-terms from the basic set of key-terms and a relevancy score from the frequency score corresponding to each of the revised set of key-terms using a reconciliation technique based on a domain language model (110), wherein the domain language model (110) comprises an exhaustive vocabulary data to be used during key-term extraction and synonym extraction, wherein the exhaustive vocabulary data is a vector representation of semantic meaning of a term or a word;
  a final key-term module (118) configured to identify a final set of key-terms from the revised set of key-terms based on the relevancy score, wherein the revised set of key-terms are sorted based on the relevancy score to generate the final set of key-terms;
a synonym module (120) for configured to determine a set of synonyms for the identified final set of key-terms based on the domain language model (110) or a language model (122) and wherein the synonym module (120) for configured to determine a set of synonyms based on the domain language model (110) or a language model, wherein for determining a set of synonyms for the identified final set of key-terms during availability of the domain language model comprising steps of:
  extracting a stemmed version of the key-term using a stemmer tool (302);
  determining at least one antonym for the key-term using a known tool or a known model (304);
  identifying a set of similar terms from the domain language model based on cosine similarity techniques (306); and
  comparing and removing the similar terms that are found to be same as the stemmed version and the determined antonym of the key-terms to obtain the set of synonyms (308); and
a display module (124) configured to display the final set of key-terms and the set of synonyms for the identified final set of key-terms.

11. The system of claim 10, wherein the acronym resolver (106) configured creating a context window, wherein the size of the context window is dynamically determined using a plurality of parameters comprising a length of the at least one identified acronym, a pre-determined average length of word and a pre-defined buffer character.

12. The system of claim 10, wherein the revised key-term module (116) is configured for determining the revised set of key-terms and the relevancy score using a plurality reconciliation technique, wherein the reconciliation techniques to be applied on the key-phrases in the basic set of key-terms comprise the steps of;
  identifying the bi-grams contained in the tri-grams, wherein the n-gram term comprises uni-gram, bi-gram and tri-gram;
  applying key-phrases reconciliation techniques based on the comparison of the frequency score of the bi-grams and the tri-grams, wherein if the frequency score of the trigram is less than the frequency score of bigram, the trigram is removed and if frequency score of the trigram is higher than the frequency score of bigram, the trigram is retained and bigram is removed; and
  adjusting the frequency score of the bi-grams and the tri-grams to obtain a relevancy score based on a pre-defined score.

13. The system of claim 10, wherein
the synonym module (120) configured for determining a set of synonyms for the identified final set of key-terms during availability of the language model comprising steps of:
  extracting a set of sentences containing the final set of key-terms from the input document;
  identifying a set of synsets, a set of hypernyms and a set of hyponyms for each the final set of key-terms, wherein a set of definition and plurality of examples are also identified for the synsets, the hypernyms and the hyponyms; and
  determining the set of synonyms for the based on Conditional Frequency Distribution (CFD) techniques using the plurality of the extracted set of sentences, synsets, hypernyms and hyponyms.

14. A non-transitory computer-readable medium having embodied thereon a computer readable program for extraction of key-terms and synonyms for the key-terms wherein the computer readable program, when executed by one or more hardware processors, cause:
  extracting, by one or more hardware processors, a raw text from a plurality of text documents using a plurality of parsing techniques, wherein the plurality of text documents is obtained from a plurality of sources;
  resolving contractions, wherein the contractions are identified and replaced in the raw text to obtain a refined raw text, wherein any word or any phrase in the raw text that has been shortened by dropping one or more letters is replaced with corresponding full form using a contraction resolution tool;
  resolving acronyms in the refined raw text to generate resolved raw terms by identifying atleast one acronym by creating a context window and replacing the identified atleast one acronym with corresponding long forms based on regular expression (regex) techniques;
  pre-processing the plurality of resolved raw text to obtain a pre-processed text, wherein the pre-processing comprises atleast one of tokenizing, part of speech (POS) tagging, filtering punctuations, filtering stop-words, filtering any excluded POS tags, lemmatizing, filtering domain specific words;
  extracting a basic set of key-terms and a frequency score, corresponding to each of the basic set of key-terms, from the pre-processed text based on a key-term extraction technique, wherein the extracted basic set of key-terms includes a plurality of keywords and a plurality of key-phrases comprising of a plurality of an n-gram terms;

determining a revised set of key-terms from the basic set of key-terms and a relevancy score from the frequency score, corresponding to each of the revised set of key-terms, using a reconciliation technique based on a domain language model;

identifying a final set of key-terms from the revised set of key-terms based on the relevancy score, wherein the revised set of key-terms are sorted based on the relevancy score to generate the final set of key-terms;

determining a set of synonyms for the identified final set of key-terms based on the domain language model or a language model corresponding to the identified final set of key-terms, wherein for determining a set of synonyms for the identified final set of key-terms during availability of the domain language model comprising steps of:

extracting a stemmed version of the key-term using a stemmer tool;

determining atleast one antonym for the key-term using a known tool or a known model;

identifying a set of similar terms from the domain language model based on cosine similarity techniques; and comparing and removing the similar terms that are found to be same as the stemmed version and the determined antonym of the key-terms to obtain the set of synonyms; and displaying the final set of key-terms and the set of synonyms for the identified final set of key-terms.

* * * * *